United States Patent
Sakatani

(10) Patent No.: US 7,305,452 B2
(45) Date of Patent: Dec. 4, 2007

(54) INFORMATION DELIVERY SYSTEM, ADVERTISEMENT DELIVERY SYSTEM, INFORMATION DELIVERY PROGRAM, SERVER, INFORMATION DELIVERY SERVER, ADVERTISEMENT INFORMATION DELIVERY METHOD AND SAVER PAGE DISPLAY METHOD

(76) Inventor: Nobuyoshi Sakatani, Meiko Bldg., 6F, 1-25-2, Hongou, Bunkyo, Tokyo, 113-0033 (JP)

( * ) Notice: Subject to any disclaimer, the term of this patent is extended or adjusted under 35 U.S.C. 154(b) by 670 days.

(21) Appl. No.: 10/020,585

(22) Filed: Oct. 22, 2001

(65) Prior Publication Data
US 2002/0075321 A1    Jun. 20, 2002

(30) Foreign Application Priority Data

| Nov. 7, 2000 | (JP) | ............................. 2000-338734 |
| Feb. 1, 2001 | (JP) | ............................. 2001-026124 |
| Jun. 29, 2001 | (JP) | ............................. 2001-200203 |

(51) Int. Cl.
G06F 15/16    (2006.01)
G06F 15/173   (2006.01)

(52) U.S. Cl. ...................... 709/217; 709/203; 709/224; 709/227

(58) Field of Classification Search ................ 709/203, 709/223, 225, 219, 224, 245, 217, 227; 705/14
See application file for complete search history.

(56) References Cited

U.S. PATENT DOCUMENTS

| 5,740,549 | A | * | 4/1998 | Reilly et al. ................... 705/14 |
| 5,796,952 | A | * | 8/1998 | Davis et al. ................. 709/224 |
| 6,102,406 | A | * | 8/2000 | Miles et al. ................. 273/430 |
| 6,119,098 | A | * | 9/2000 | Guyot et al. .................. 705/14 |
| 6,300,936 | B1 | * | 10/2001 | Braun et al. ................. 715/708 |
| 6,314,451 | B1 | * | 11/2001 | Landsman et al. .......... 709/217 |
| 6,442,529 | B1 | * | 8/2002 | Krishan et al. ............... 705/14 |
| 6,516,338 | B1 | * | 2/2003 | Landsman et al. .......... 709/217 |
| 6,880,123 | B1 | * | 4/2005 | Landsman et al. .......... 709/217 |
| 7,089,194 | B1 | * | 8/2006 | Berstis et al. ................. 705/14 |
| 2001/0016858 | A1 | * | 8/2001 | Bates et al. ................. 707/513 |

FOREIGN PATENT DOCUMENTS

| JP | 09-244981 | 9/1997 |
| JP | 11-025042 | 1/1999 |
| JP | 11-053285 | 2/1999 |
| JP | 11-212534 | 6/1999 |

(Continued)

Primary Examiner—Saleh Najjar
Assistant Examiner—Benjamin R Bruckart
(74) Attorney, Agent, or Firm—Darby & Darby

(57) ABSTRACT

In an information terminal of a user, displayed contents on a monitor screen are optionally changed and a saver page is displayed by use of a browser.

An information delivery system is provided, which is constituted of a viewer PC, an information provider server, and an information delivery server for providing delivery information based on access from the viewer PC over a network. The information provider server transmits an HTML file to the viewer PC in response to being accessed by the viewer PC. When an entering operation is not executed for a predetermined period of time after the viewer PC displays the received HTML content on a display unit as display information, the viewer PC accesses the information delivery server via a network and automatically retrieves and displays delivery information on the display unit.

12 Claims, 12 Drawing Sheets

FOREIGN PATENT DOCUMENTS

| | | |
|---|---|---|
| JP | 2000-222324 | 8/2000 |
| JP | 2001-118006 | 4/2001 |
| WO | WO-99/60504 | 11/1999 |
| WO | 00/08802 | 2/2000 |
| WO | 00/30008 | 5/2000 |

* cited by examiner

CHOOSE CATEGORIES YOU DON'T
WANT TO BE DELIVERED

☑ AUDIO-VISUALS ☐ COMPUTERS ☐ INDUSTRIAL EQUIPMENT
☐ AUTOMOTIVE ☑ HEALTH FOODS ☐ FINANCE
☐ COSMETICS ☑ ADULT ☐ REAL ESTATE
☐ SPORTS ☐ GAMES ☐ MOVIES/MUSIC
☐ COMMUNICATIONS AND TELEPHONES ☐ ○○○○ ☐ ○○○○
☐ ○○○○ ☐ ○○○○ ☐ ○○○○
☐ ○○○○ [ TRANSMIT ] ~53

52

CHOOSE CATEGORIES YOU WANT
TO BE DELIVERED

☐ AUDIO-VISUALS ☐ COMPUTERS ☐ INDUSTRIAL EQUIPMENT
☑ AUTOMOTIVE ☐ HEALTH FOODS ☐ FINANCE
☐ COSMETICS ☐ ADULT ☐ REAL ESTATE
☑ SPORTS ☐ GAMES ☐ MOVIES/MUSIC
☐ COMMUNICATIONS AND TELEPHONES ☐ ○○○○ ☐ ○○○○
☐ ○○○○ ☐ ○○○○ ☐ ○○○○
☐ ○○○○ [ TRANSMIT ] ~54

(b)

0 0 0 0 [0] 0 0 0 0 0 0 0 0 0 0 . . . . .
     ↖ HEALTH FOODS 0 0 0 0 1 0 0 0 1 1 1 0 0 0 0 0 . . . . .

FIG. 10
(a)
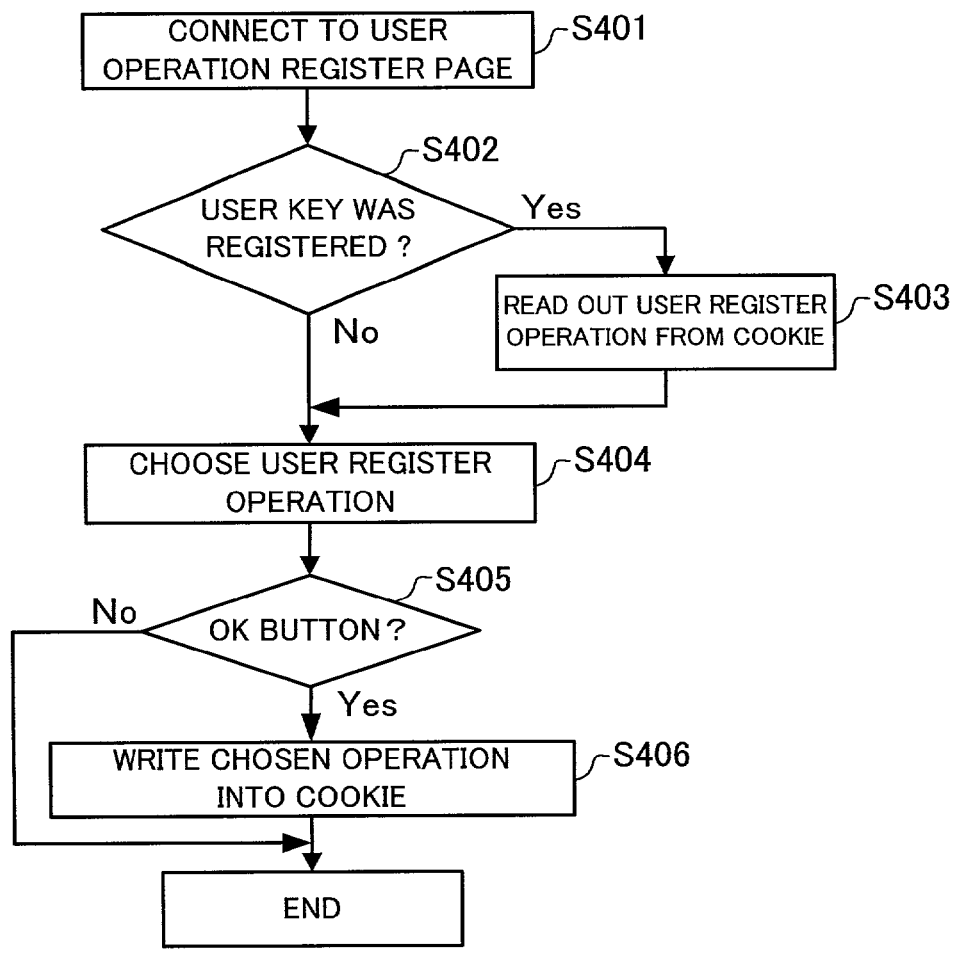
(b)
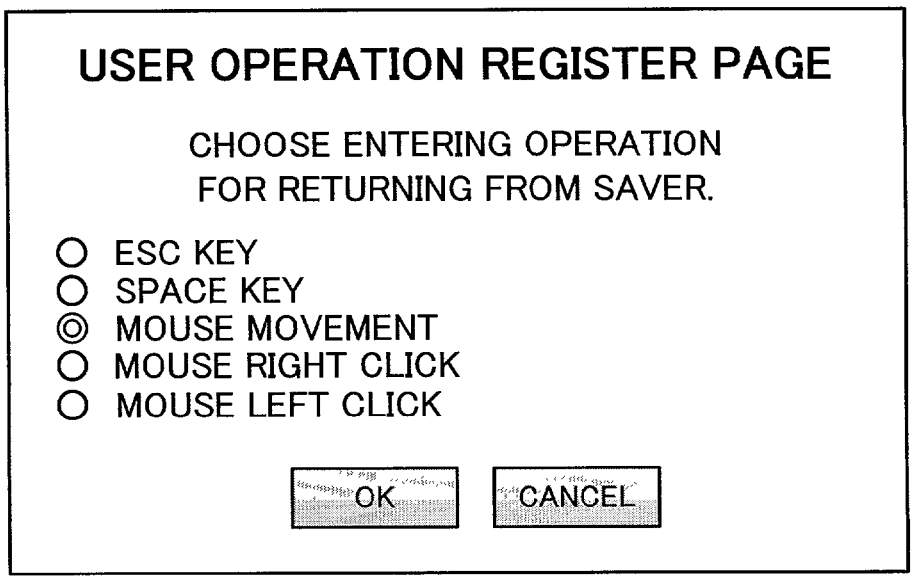

FIG.12

LOG FILE(DB) FORM

| USER IP ADDRESS | ORIGINAL PAGE URL | DELIVERY TIME | VIEWER ATTRIBUTE (SEX, ETC.) | PAGE CATEGORY | SESSION ID | DELIVERED CONTENT ID | BROWSER AND OS |
|---|---|---|---|---|---|---|---|
| 210.145.165.4 | www.xxx.com/index.html | 2000/4/5:00:04:00:123 | MALE, 30 YEARS, FUKUOKA, OFFICE WORKER | TOTAL SEARCH | 1-a-2-d-4f-ijld | 3284031 | NN4.7 WinME |
| 210.145.165.41 | zyoluou.co.jp/kjss.fk.jhtml | 2000/4/5:00:04:20:1 | FEMALE, 25 YEARS, TOKYO, OFFICE WORKER | COSMETICS SALES | 1-a-2-d-4f-ijld | 3284045 | IE5.0 Win98 |
| 210.145.165.21 | yyy.co.jp/ajigf.html | 2000/4/5:00:04:21:2 | MALE, 27 YEARS, FUKUSHIMA, OFFICE WORKER | HEALTH FOODS | 1-a-2-d-4f-ijkl | 3284033 | IE5.5 Win98 |
| 210.145.165.3 | yyy.co.jp/ajigf.html | 2000/4/5:00:04:22:555 | MALE, 24 YEARS, AOMORI, OFFICE WORKER | AUTOMOTIVE | 1-a-2-d-4f-ijks | 3284051 | IE5.5 NT4.0 |
| 210.145.165.47 | yyy.co.jp/ajigf.html | 2000/4/5:00:04:27:55 | MALE, 43 YEARS, YAMAGATA, OFFICE WORKER | PRIZE | 1-a-2-d-4f-ijsn | 3284057 | IE4.0 MAC |
| 210.145.165.3 | yyy.co.jp/ajigf.html | 2000/4/5:00:04:30:11 | MALE, 26 YEARS, AOMORI, OFFICE WORKER | AUTOMOTIVE | 1-a-2-d-4f-ijke | 3284058 | IE5.5 NT4.0 |
| 210.145.165.3 | yyy.co.jp/ajigf.html | 2000/4/5:00:04:31:12 | MALE, 27 YEARS, AOMORI, OFFICE WORKER | AUTOMOTIVE | 1-a-2-d-4f-ijke | 3284054 | IE5.5 NT4.0 |

① ② ③ ④ ⑤ ⑥ ⑦

INFORMATION DELIVERY SYSTEM, ADVERTISEMENT DELIVERY SYSTEM, INFORMATION DELIVERY PROGRAM, SERVER, INFORMATION DELIVERY SERVER, ADVERTISEMENT INFORMATION DELIVERY METHOD AND SAVER PAGE DISPLAY METHOD

BACKGROUND OF THE INVENTION

1. Field of the Invention

The present invention relates to a network system or the like for delivering information, more particularly to the network system or the like which provides information to a user connected to a network in a similar manner to a screen saver displayed on a screen of a personal computer (PC).

2. Background of the Invention

In a case where an operation such as entering is not carried out for a personal computer (PC) for a while after the PC is made available, for example, a screen saver function has been heretofore made to operate. In order to prevent burn-in of a screen of a cathode ray tube (CRT), by use of the screen saver function, when entering is not executed in the PC for a predetermined period of time, the screen is automatically darkened and an animation or the like is displayed on the screen. In order to use the screen saver function, a screen saver program of an OS-dependent program form is generally installed in each PC.

Next, description will be made on an outline of the screen saver function. In the screen saver function, with entering to the PC, a timer count value at the time is reset, and new timer counting is started. When the timer count value reaches a time previously set (a predetermined time) without any entering to the PC, a predetermined image such as an animation is displayed on a monitor screen. Thereafter, when entering is executed in the PC, the monitor screen is restored to an original state, the timer count value is reset and then the timer counting is restarted.

Meanwhile, from a viewpoint of an advertisement delivery, which is a form of information delivery, banner advertising is generally performed as the conventional advertisement delivery. In this form of advertising, an advertisement of a signboard type is displayed on a Web page. Specifically, the banner advertising is utilized as display advertising for Web pages on a search site or the like of a certain domain. The banner advertising is that advertisement information which is attached to a part of a Web page of the search site, and shows high utilization since advertising cost is low for an advertiser. In click-through banner advertising, it is possible for a user by a click operation to move to a site of advertising information in the Web page that the user desires to look at. Thus, one-to-one marketing is achieved, which is a method of providing information customized for each user.

As another form of advertisement delivery, which is also a form of information delivery pop-up type advertisement delivery is commonly known. In the pop-up type form of advertisement delivery, a plurality of target advertisements are sequentially shown to the user in a pop-up manner. Since a new window is opened for advertising, the pop-up type advertisement delivery is advantageous in that a comparatively large sized advertisement can be seen.

Furthermore, for example, there also exists technology for push type information delivery, such as PointCast Network service started by PointCast Inc. in the U.S. In the push-type form of information delivery, HTML contents of a WWW server are delivered to the Internet users by use of push technology.

In order to use an OS-dependent screen saver, a screen saver program must be installed in to each PC. For installation of the new screen saver program on the PC, the user must carry out the installation by himself or herself. In such a case, the operation of the installation is complicated not only for a user unfamiliar thereto but also for a somewhat skilled user. Furthermore, when the displayed contents (an animation or the like) on a monitor screen by a screen saver is desired to change to another contents, another screen saver program must be again installed on the PC. Therefore, the displayed contents on the monitor screen cannot be quickly changed when it is desired.

In the form of advertisement delivery by banner advertising, which also a form of information delivery, small advertising effect is obtained by the banner itself, and an advertisement image is small, so that it is difficult to differentiate one advertisement from another. In addition, since banner advertising is directly added to a site for inserting the advertisement to be displayed, there is also a problem that a design of the site for inserting advertisement is ruffled. In the pop-up type advertising, the advertisement can be seen in the comparatively large size. However, since many windows are opened, a very burdensome task of closing the windows is passed on to the user. Moreover, when the user wants to finish looking at the advertisements, the user is required to close the windows opened for advertising one by one. Such operation is intolerable for the user.

In the push type delivery like the PointCast Network service, client software needs to be installed in a PC terminal of the viewer. Moreover, depending on the way of using the dedicated client software, traffic on a corporate network is increased, for example, resulting in obstacles to communications for main business. Therefore, some corporations have avoided such a service.

In addition, when the user desires to control the screen saver by oneself, the user needs to perform complicated operations such as reset of a set time for the screen saver that is installed in his or her own computer. Moreover, it was difficult to flexibly use the screen saver in such a way that the screen saver was started depending on a situation.

SUMMARY OF THE INVENTION

The present invention is made to solve such technical problems, and the object is to generally manage changes of the displayed contents on the monitor screen.

Another object of the present invention is to make it possible to optionally change the contents displayed on the monitor, and to eliminate the necessity of the user to reinstall programs to change the screen saver on the user's terminal.

Still another object is to equip an information delivery in a network system with a high capability of information transmission.

Still another object is to efficiently deliver information in a one-to-one manner to enhance availability of information.

In order to achieve the foregoing objectives, a first aspect of the present invention is an information delivery system, via a network, which is constituted of a computer terminal, an information provider server, and an information delivery server for providing delivery of information in response to being accessed by the computer terminal. The information provider server transmits a content in response to an access by the computer terminal. The computer terminal accesses a predetermined server such as the information delivery server, via a network, and automatically retrieves and displays delivery information when entering operation is not executed during a predetermined period of time after a received content is displayed as display information. The present invention differs from a conventional screen saver function in its objectives and its constitution thereof. Since the primary object of having a conventional screen saver function is to prevent burn-in of a screen, a saver picture is naturally displayed over an entire screen. In contrast the primary object of the present invention is to enhance the availability of information, and the saver picture according to the present invention is displayed within a range of the screens provided by an internet browser . Therefore, the function, to which the present invention is applied, could be defined as being a "browser saver". It should be noted that the browsers include software received and reproduced in data formats such as Real Player or Media Player developed by Real Networks Inc. in the U.S.

Further, it should be noted that the server can be transposed as a site and does not necessarily require a single server computer apparatus. A site could be for example constituted of a plurality of server computer apparatuses. On the other hand, functions of a plurality of sites may be included in the server computer apparatus constituted of a single piece of hardware. In other words, regarding the term "server" used in the present invention, it does not matter whether the term "server" indicates a single server computer apparatus or a plurality of server computer apparatuses described herein.

A second aspect of the present invention is an advertisement delivery system for automatically delivering advertisements to a viewer computer terminal, via a network. In the advertisement delivery system, an information receiving program is embedded in HTML formatted content which is obtained by the viewer computer terminal via the network. After the HTML formatted content, having the information receiving program embedded is displayed on the viewer computer terminal, based on predetermined conditions, advertising information delivered in response to being accessed by the viewer computer terminal is rendered to be displayed on a screen.

The information receiving program received via a network may be embedded in the HTML formatted content based on tag information provided in the HTML formatted content obtained by the viewer computer terminal. Such a constitution is preferable in that the function of the present invention can be obtained by just adding simple tag information written in one line, for example, to the HTML formatted content itself received via the network.

The embedding of the information receiving program may be executed based on tag information, which is embedded in the HTML formatted content on a relay server for relay of a server providing the HTML formatted content, or based on tag information which is embedded in the HTML formatted content when the HTML formatted content passes through a provider for providing the viewer computer terminal with a connecting service. Moreover, at the relay server or the provider, the information receiving program may be directly embedded, in place of the tag information. In these constitutions, by embedding tag information in a proxy type, the time and labor for embedding the tag information or the like in the HTML formatted content itself can be saved.

The proxy type system is advantageous in that the function of the present invention can be provided regardless of a site, which the viewer accesses. In principle, the tag or the program itself is embedded in the content of an information provider in the case of a delivery for the viewer accessing the site thereof. Therefore, it becomes possible for a provider of a free information site to earn revenue from introducing viewers to other providers' sites. An information delivery program according to the present invention causes a computer to execute an entering operation judgment function for judging that an entering operation by a user is not executed for a predetermined period of time under a condition that a Web page obtained via a network is displayed; a content obtaining function for obtaining a content from a predetermined server via the network in the case that it is judged that the entering operation is not executed by said entering operation judgment function; and a content display function for displaying the content obtained. Note that the term "predetermined period of time" means also a period of time in the case where the timing for displaying the screen saver page (browser saver page) is set before the timing of changing the display to the screen saver page.

It is preferable that the content display function switches the screen from displaying the content of the displayed Web page so that information such as advertisements can be displayed by a function similar to that of a screen saver.

Moreover, in the content display function, in the case where a predetermined entering operation is executed by a user after the content is changed to be displayed, a display restart function for restarting to display of the Web page can be further executed.

Furthermore, a computer can be further caused to execute a category specifying function for allowing a user to specify a category, which the user desires to obtain by use of said content obtaining function; and a writing function for writing information regarding the category, which is specified by the category specifying function, into a cookie as user information. As the category specifying function, there exist a method of registering by separating categories into the categories which viewer wants to be delivered and the categories, which the viewer does not want to be delivered and the like.

From another viewpoint, a third aspect of the present invention is an information delivery program, which executes a predetermined function for an HTML formatted content obtained via a network to be displayed on a computer. The information delivery program causes a computer to execute a supervising means for supervising an operation by a viewer for a browser equipped with a computer in a state where the HTML formatted content is displayed by the browser; and a displaying means for displaying an obtained delivery content in exchange for the HTML formatted content when a viewer's operation to the browser is not executed under a predetermined condition. As the delivery content, the delivery content previously embedded in the HTML formatted content may be conceived.

The delivery content may be content specified in a server, which provides the HTML formatted content, or content which the browser obtains by accessing an information delivery server connected to the network.

Moreover, the supervising means may be provided with a timer function operating by counting up after the HTML formatted content is displayed by the browser, or by counting up after a predetermined entering operation is executed by a viewer, and the operation by the viewer may be supervised by use of the timer function.

A fourth aspect of the present invention is a server which is connected to a network and provides a computer apparatus connected to the network with a predetermined program. The server includes an accepting means of a program receiving request for accepting a program receiving request executed based on tag information contained in an HTML content which is obtained by the computer apparatus via the network; and a program providing means for providing an information receiving program based on the accepted program receiving request. The information receiving program is for accessing a predetermined server via the network from the computer apparatus to pull a screen saver page (browser saver page), which is to be displayed on the computer apparatus. Note that the term "server" can be considered as a site, and is not limited to a computer apparatus physically constituting a single unit.

An information delivery server, to which the present invention is applied, includes an access accepting means for accepting an access from a computer apparatus based on an action of an information receiving program for HTML content displayed on the computer apparatus; and a delivery information providing means for providing the computer apparatus with a delivery content in response to the access from the computer apparatus, the delivery content being automatically displayed when a predetermined entering operation is not executed for the displayed HTML content.

The information delivery server is provided with a judgment means for judging whether or not the computer apparatus belongs to a predetermined group specified in a corporate contract or the like. The delivery information providing means provides the computer apparatus with information of a delivery content within a range predetermined by a unit of the predetermined group. Accordingly, for example, it can be prevented by a unit of an enterprise that advertising information of a competitor or the like, which is not desired to be delivered, is made to appear.

The fifth aspect of the present invention is an advertising information delivery method for delivering advertising information to a viewer computer terminal via a network. The advertising information delivery method includes the steps of: embedding an information receiving program in the HTML content obtained by the viewer computer terminal; supervising an entering operation for the viewer computer terminal by use of the information receiving program after the HTML content is displayed; and when the entering operation is not executed for a predetermined period of time, delivering the advertising information to the viewer computer terminal from a predetermined server via network-based access by a viewer computer terminal.

BRIEF DESCRIPTION OF THE DRAWINGS

FIG. 7A and FIG. 7B are views for explaining filtering of delivery contents to the viewer PC 11.

FIG. 10A and FIG. 10B are views for explaining a register operation of a user operation.

FIG. 12 is a view showing a form example of a log file (DB) stored in an information delivery server.

DESCRIPTION OF THE PREFERRED EMBODIMENTS

In the following, detailed description will be made on the present invention based on embodiments shown in accompanying drawings.

Figure 1:
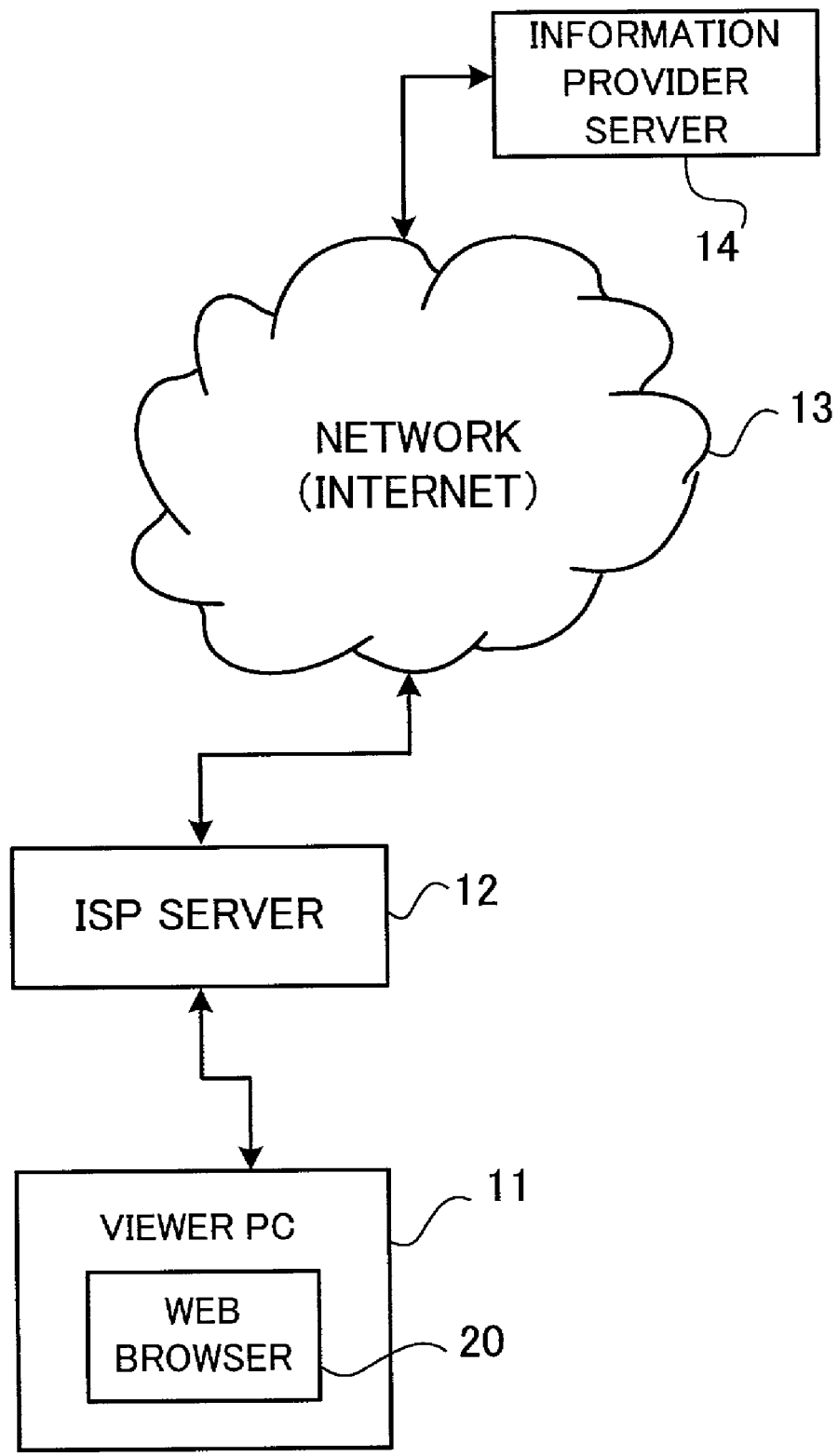
FIG. 1 is a block diagram for illustrating an example of a network system according to an embodiment of the present invention.

FIG. 1 is a block diagram illustrating an example of a network system, in which a browser saver according to the embodiment is executed. Generally, the viewer personal computer (viewer PC) 11 as an information terminal is often connected to an Internet service provider (ISP) server 12. The viewer PC 11 is provided with a Web browser 20 to perform transmitting, receiving, browsing or the like of various kinds of information via a network 13 such as the Internet. For the sake of explanation, one viewer PC 11 is shown in FIG. 1, but in reality, the plurality of viewer PCs 11 are connected to the network 13. Note that, as the viewer PC 11, in addition to the personal computers, employed are information terminals capable of browsing Web pages, information terminals capable of connecting to the network 13 by wireless, such as Personal Digital Assistant (PDA) and mobile phones.

On the network 13, an information provider server (site) 14 is provided as a site for providing various kinds of information. The information provider server 14 provides the Web browser 20 with various kinds of information in response to a request (access) from the Web browser 20. In a communication between the Web browser 20 and the information provider sever 14, the Hypertext Transfer Protocol (HTTP) on the Transmission Control Protocol/Internet Protocol (TCP/IP) is employed. The information provider server 14 transmits a World Wide Web (WWW) document of a page specified by the browser 20. In an example shown in FIG. 1, for the sake of explanation, only one information provider server 14 is shown, but in reality, the plurality of information provider servers 14 exist on the network 13.

A WWW document is described in Hypertext Markup Language (HTML). In specifying the WWW document by the Web browser 20, or linking the WWW document with another WWW document, the Uniform Resource Locator (URL) is used to specify the information provider server 14 having contents located. The WWW document as a hypertext can include a link (pointer) to another associated information.

Figure 2:
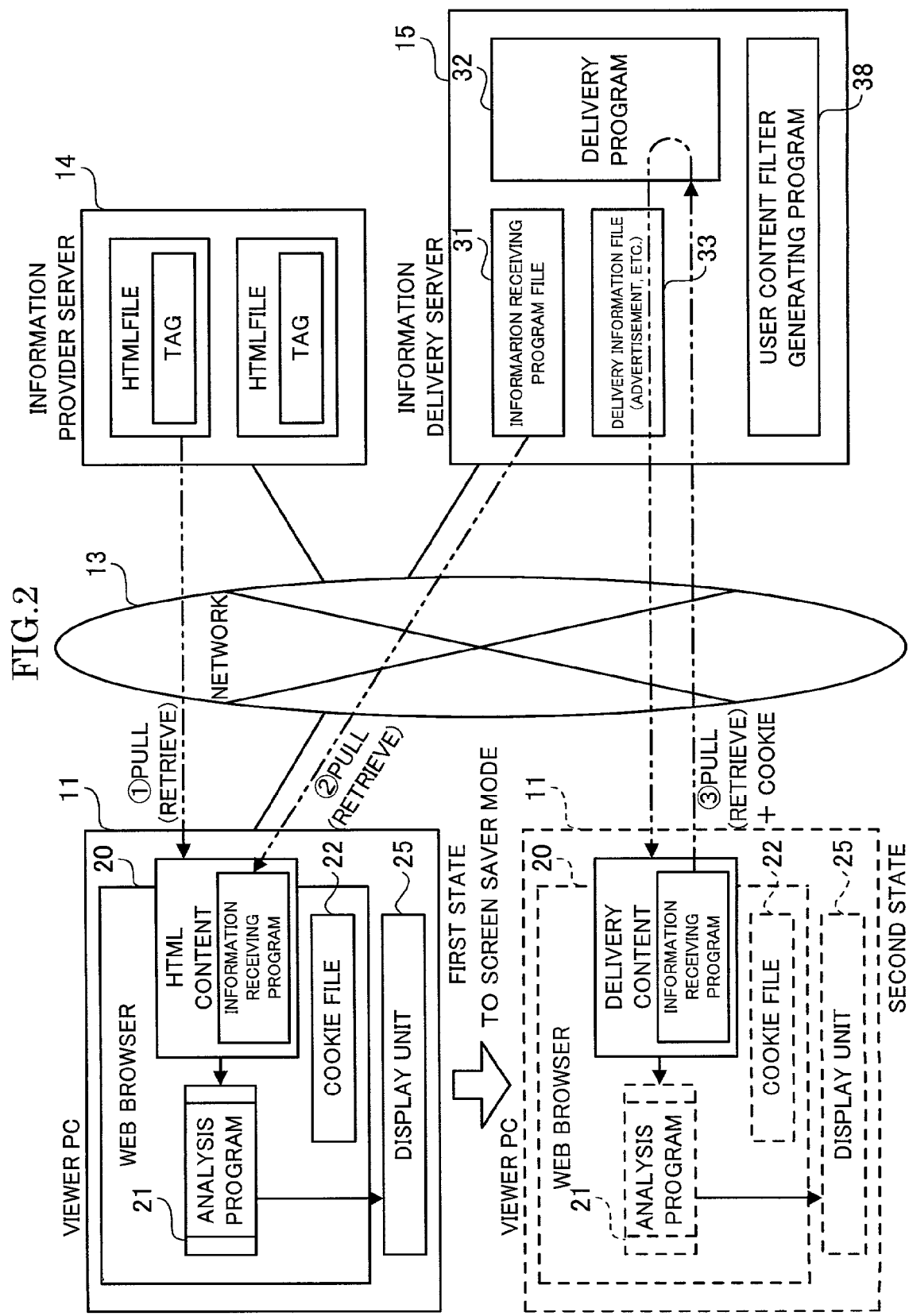
FIG. 2 is an entire constitution diagram for further illustrating the network system according to the embodiment.

FIG. 2 is an entire constitution diagram for further illustrating the network system according to the embodiment. In FIG. 2, an information delivery server (information delivery site) 15 is connected to the network 13. The information delivery sever 15 provides the viewer PC 11 with an information receiving program which is a characteristic of the embodiment. In FIG. 2, the information provider server (information provider site) 14, which is connected to the network 13 shown in FIG. 1, and the viewer PC 11 provided with information are shown. A first state and a second state of the viewer PC 11 are shown in FIG. 2. In the first state, an HTML content has been received from the information provider server 14 for the first time in response to a request of the Web browser 20, and in the second state, another content (delivery content) has been delivered from the information delivery server 15 by an operation of the information receiving program. Note that the information provider server 14 and the information delivery sever 15 can be considered as sites. Each of the servers 14 and 15 is not limited to be a single server computer apparatus, and can be considered to take various physical forms.

The information delivery server 15 is provided with an information receiving program file 31, which provides the Web browser 20 with the information receiving program in response to PULL (retrieving operation) from the Web browser 20. Furthermore, the information delivery server 15 is provided with a delivery program 32 and a delivery information file 33. The delivery program 32 provides the viewer PC 11 with delivery information in response to PULL operation from the Web browser 20 by the provided information receiving program. The delivery information file 33 stores the delivery information such as advertisements to be delivered. Furthermore, the information delivery server 15 is provided with a user content filter generating program 38 to specify categories of information contents, which the viewer does not want to be delivered, or which the viewer want to be preferentially delivered. Note that the information delivery server 15 may not be equipped to include all of these functions, but, for example, the server providing the information receiving program file 31 and the sever providing the delivery information can be constituted by separate servers.

Meanwhile, the viewer PC 11 is provided with a display unit 25 for displaying received or delivered information. The Web browser 20 is provided with an analysis program 21 and a cookie file 22 for providing information of the Web browser 20 to the information delivery server 15. The analysis program 21 interprets contents in the HTML format in order to display the contents for a user as a viewer.

In the embodiment, the Web browser 20 of the viewer server PC 11 accesses the information provider server 14 to pull contents, such as a homepage described in the HTML, by use of the URL (PULL operation). The information provider server 14 provides an HTML file (HTML formatted content) in response to the PULL operation from the Web browser 20. The HTML formatted content includes a tag, and the tag contains information for pulling the information receiving program. As shown in the first state of the viewer PC 11, the Web browser 20 having received the HTML content accesses the information delivery server 15 based on the tag contained in the HTML formatted content (PULL operation) to receive the information receiving program from the information receiving program file 31 in the information delivery server 15.

In the Web browser 20, the HTML content is analyzed by the analysis program 21, and the information is displayed by the display unit 25. The information receiving program received as described above may be a program capable of being interpreted by standard browsers, such as a program described in the Java Script that is an object oriented scripting language, or the like. In the case where the browser does not have an interpreting function, or in the case where the interpreting function is set to be not available by the user oneself as the viewer, the information receiving program is simply recognized as comments in the HTML, and the viewer can browse the HTML formatted content as usual.

In the second state of the viewer PC 11, the Web browser 20 accesses the information delivery server 15 to pull the delivery information by use of the information receiving program (PULL operation). At this time, the Web browser 20 transmits the user information of the Web browser 20 to be provided for the information delivery server 15, the user information being stored in the cookie file 22, to the information delivery server 15 by use of the cookie. The information delivery server 15 causes the delivery program 32 to operate in response to the request from the Web browser 20, and provides the Web browser 20 with the delivery information, such as advertisements, from the delivery information file 33. At this time, categories of the delivery information to be delivered are separated and provided based on the user information of the cookie received from the Web browser 20.

In this second state of the viewer PC 11, unless a predetermined entering operation is performed by the viewer, the viewer PC 11 pulls the delivery information by use of the information receiving program every 15 seconds, for example. Consequently, advertising information as the delivery information, for example, appears on the browser in the screen of the viewer PC 11, like a screen saver. In the following description, the function employed in the embodiment is referred to as "screen saver" because the function is similar to that of the screen saver. However, since the information is displayed on the browser for displaying HTML contents, it can be said that the expression "browser saver" is also preferable for the function.

Figure 3:
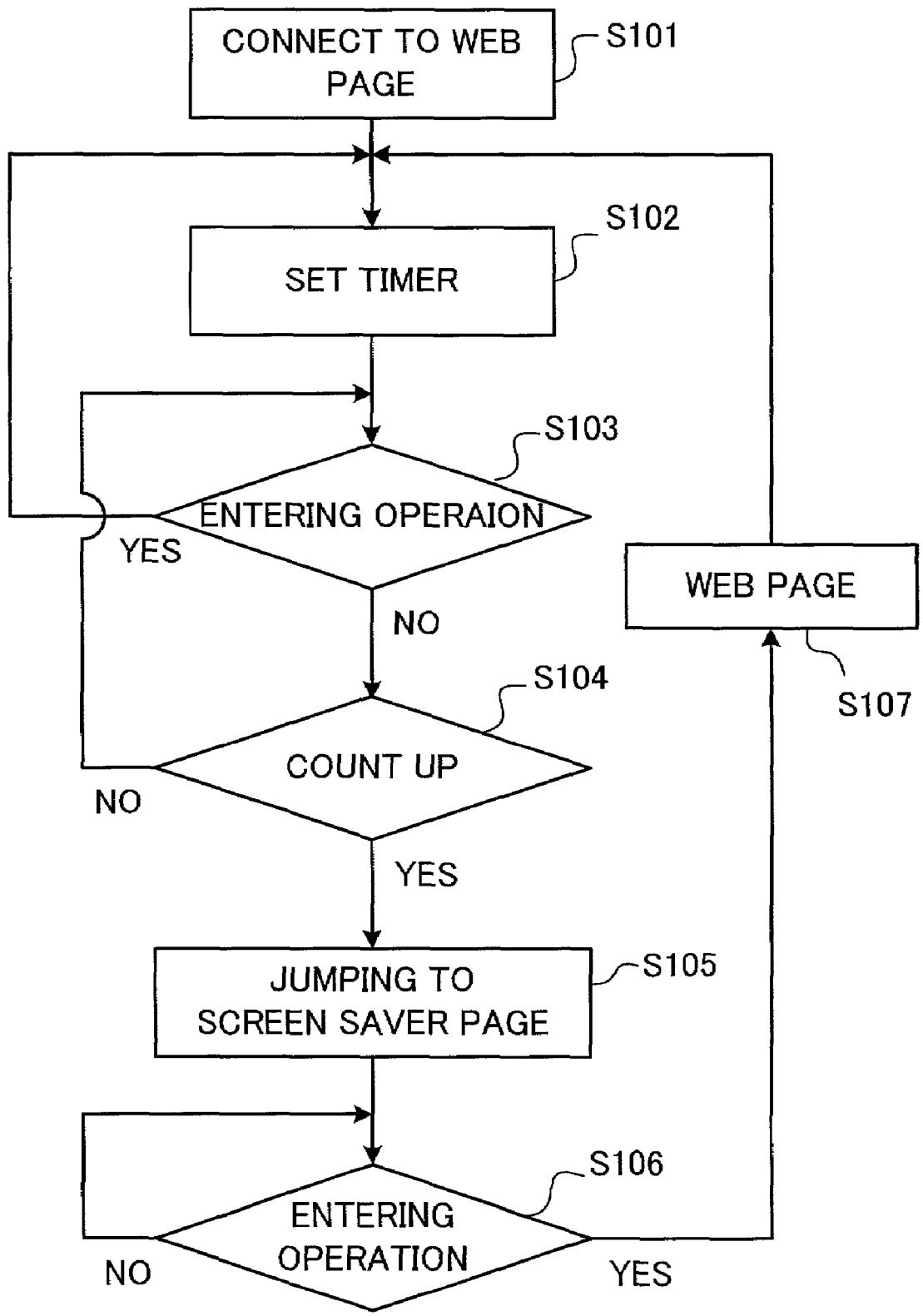
FIG. 3 is a flow chart showing a process executed by the viewer PC 11.

FIG. 3 is a flow chart showing a process executed by the viewer PC 11. First, the user as the viewer starts the viewer PC 11, and accesses a predetermined Web site on the information provider server 14 via the network 13. The first Web page that is accessed and obtained by the Web browser 20 is referred to as "original Web page". As a matter of course, the user can browse the original Web page and pull various kinds of information or the like by operating a pointing device such as a mouse or an input device such as a keyboard (not shown).

In this way, the Web browser 20 is connected to the information provider server 14, the original Web page as the HTML content is obtained (step 101). The Web browser 20 allows the display unit 25 including a CRT or a liquid crystal display (LCD) to display the received original Web page, while the Web browser 20 accesses the information delivery server 15 based on the tag contained in the HTML content to receive the information receiving program. Sequentially, the Web browser 20 starts execution of the information receiving program so that a screen saver routine is executed. In such a manner, the information receiving program can be automatically embedded in the HTML content based on the tag at the time of the delivery. Note that the process can be also constituted such that the information receiving program applied in the embodiment is previously embedded in the HTML formatted content as the original Web page to omit the operation of pulling the information receiving program from the information delivery server 15.

The screen saver routine of the information receiving program includes a timer function. And the predetermined time (specified time) is set, and timer counting is started. In the Web browser 20 executing the information receiving program, an entering operation on the viewer PC 11 by the user is supervised. When the operation from the input device is executed, the timer is set (step 102). After the timer setting, the execution of the entering operation for the input device is supervised (step 103). With the entering operation, the routine is returned to the step 102, and the timer is set. Without the execution of the entering operation, whether or not the timer is counted up is judged (step 104). In a state that the timer is not counted up, the entering operation is supervised in step 103. When the predetermined time is passed and the timer is counted up without an operation to the entering apparatus, the jump to image information (here, referred to as a screen saver page (browser saver page)) displayed like the screen saver is automatically executed (step 105).

The jump to the screen saver page in step 105 is executed by receiving the delivery information from the information delivery server 15 by use of the information receiving program as shown in a second state of the viewer PC 11 in FIG. 2. Specifically, the Web browser 20 displays the received content of the delivery information through the analysis program 21 on the display unit 25. At this time, the delivery program 32 of the information delivery server 15 functions so as to provide, for example, information of a favorite site of the user, which is set for each user, from the delivery information file 33 based on the user information recognized by the cookie. Moreover, new contents can be sequentially provided along the passage of time.

In addition to the aspect shown in FIG. 2, a constitution may be employed, in which the Web browser 20 directly accesses the information provider server 14 which is another site to obtain the content displayed on the screen saver page. For example, in the case where the URL of the link destination other than the information delivery server 15 is contained in the information receiving program which performs a screen saver routine, the HTML content which is displayed following the original Web page may be obtained directly from the information provider server 14, which may be a server of another information provider, without using the information delivery server 15.

As the Web browser 20 provided with the viewer PC 11, used are several kinds of browser, such as Internet Explorer provided by Microsoft Corp. in the U.S. and Netscape Navigator provided by Netscape Communications Corp. in the U.S. Moreover, the browser of a different version functions differently. This embodiment allows the judgment which process is executed in accordance with the kind of browser. The judgment can be executed on the information delivery server 15, as well as on the viewer PC 11. In the case of the judgment on the information delivery server 15, the program to be embedded is changed in accordance with header information of the HTTP request. In the case of the judgment on the viewer PC 11 of the client side, the several kinds of the information receiving program are previously embedded in the HTML formatted content corresponding to the several kinds of browser. Then, the program executed on the viewer PC 11 obtains information of the browser executed at the time, and the program to be executed can be decided.

After jumping to the screen saver page in step 105 in FIG. 3, within the information receiving program of the Web browser 20, it is determined whether the entering operation for the input device has been executed or not (step 106). If no entering operation has been executed, while awaiting such execution the screensaver pages are sequentially displayed. . For example, the displayed content can be made to periodically change to another screen saver page, or to automatically jump to another screen saver page, each time the predetermined period of time (15 seconds) has been passed. With the entering operation, the displayed content is returned to the page just before the screen saver page (hereinafter, referred to as last page), which is now the original Web page (step 107). The routine is returned to step 102, and the timer setting is re-executed. The case where the displayed content is sequentially changed to another screen saver page is not necessarily limited to the case where the URL thereof is changed. In reality, the step can be constituted such that only the content, such as a Flash or an image file, displayed in the page is changed without changing the URL.

Note that, as the method of returning to the last page shown in step 107, a cache function equipped with the Web browser 20 may be used. In the case where the Web browser 20 does not have the cache function, in the case where the cache function is set to be off (no Cache in Meta tag) in the page having been displayed, or the like, the URL of the last page may be satisfactorily made to be stored in the information receiving program for returning thereto. Moreover, in returning to the last page, the action of returning to the last page or not can be performed depending on the kind of the entering operation. For example, the following setting can be made. In the case where the entering operation by the user is a predetermined operation such as depressing of the enter key or a space key, the displayed page is not returned to the last page. Only in the case of the other operations, the displayed page is returned to the last page. In such a constitution, a predetermined action can be performed for the Web page displayed as the screen saver page. For example, when a target page further linked with the screen saver page is required to be displayed regarding the information such as advertisements displayed in the screen saver page, the specified key operation enables the predetermined action to occur without return to the original Web page. Thereafter, by disconnection of the Web browser 20 and the information provider server 14, the subroutine of the screen saver shown in FIG. 3 is terminated.

Note that there exist several methods of obtaining the delivered information (content). In one of the methods, for example, the content to be displayed on the viewer PC at the time when the screen saver is displayed is previously specified in the information provider server 14 (for example, specifying the URL, receiving the content, or the like), and when the Web page is obtained in step 101, the specified content to be displayed as well as the HTML formatted content are received and stored by the client. In another method, as described above, the Web browser 20 of the client side accesses the information delivery server 15 and obtains the delivered information.

As for the timing of obtaining the display information, in order to realize smooth display change, it is possible to start loading of the delivery content several seconds before the timing of actual delivery of the information within the information receiving program. Accordingly, it becomes possible to change the display at the moment of changing to the screen saver mode.

Figure 4:
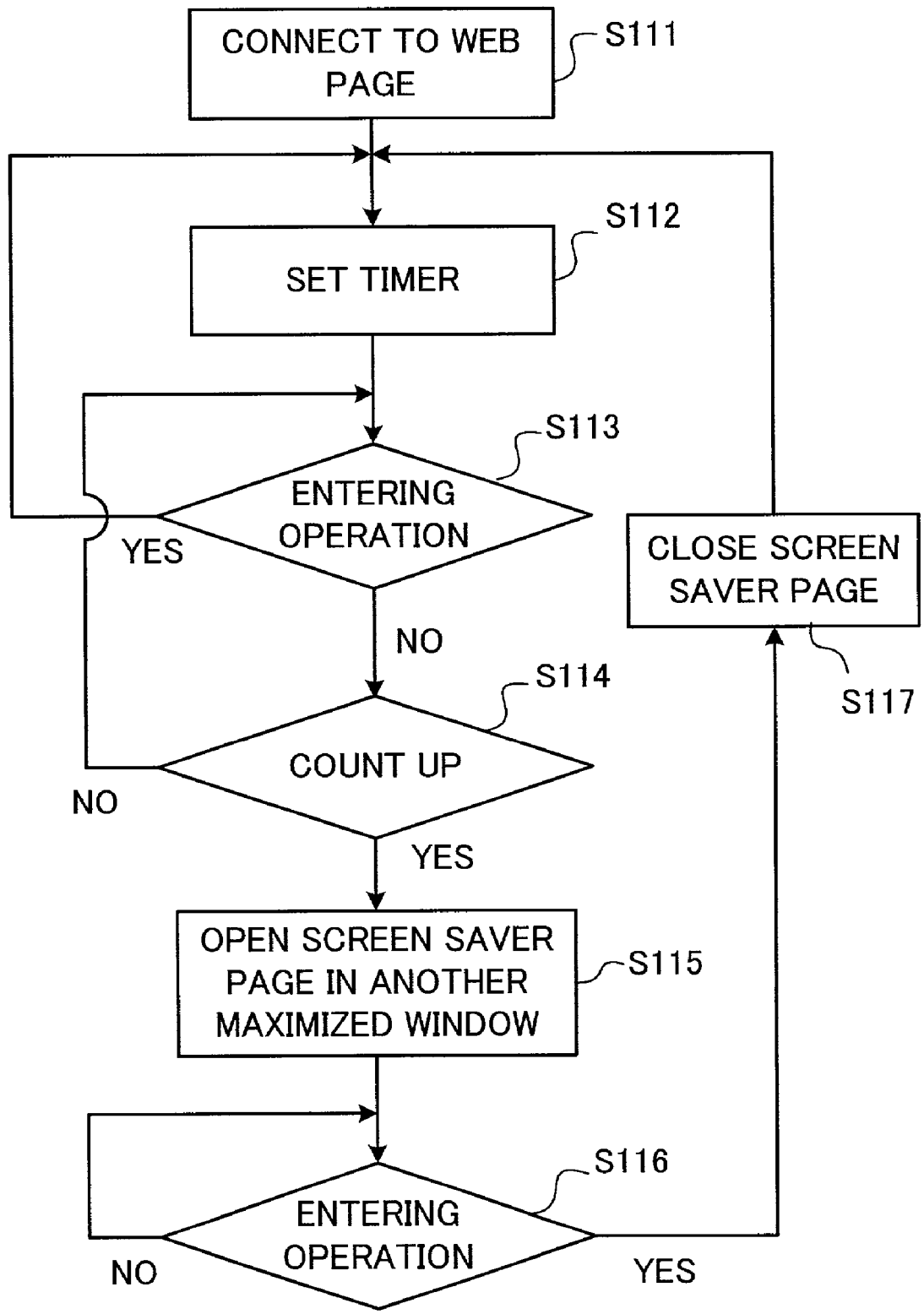
FIG. 4 is a flowchart showing a separate window type process in which a screen saver page is displayed on a window other than the original Web page.

FIG. 4 is a flowchart showing a separate window type process in which the screen saver page is displayed on another window than the original Web page. Step 111 to step 114 shown in FIG. 4 are similar to step 101 to step 104 shown in FIG. 3, respectively. Specifically, the Web browser 20 is connected to the information provider server 14 to obtain the Web page (step 111); the timer is set (step 112); the entering operation is supervised (step 113); and the end of the specified time is judged by whether or not the timer is counted up (step 114). Sequentially, when the specified time passes without operation from the input device, the screen saver page is opened on another maximized window (step 115).

Thereafter, in the Web browser 20, whether or not the entering operation from the input device is executed is judged (step 116). Without the execution of the entering operation, the screen saver page continues to be displayed. At this time, as for displaying of the screen saver page, a constitution can be used, in which another Web page is displayed after each predetermined period of time such that information is periodically changed. When the entering operation is detected in step 116, the window of the screen saver page is closed (step 117), and the window of the original Web page is remained, and then the process is returned to step 112.

Note that the following constitution can be employed. The judgment of execution of the entering operation shown in step 113 is omitted. When the passage time (specified time) of step 114 is passed after the Web page is displayed, jumping to the screensaver page is compulsorily performed. For example, regardless of execution of the entering operation by a user, when it is judged that the Web page has been displayed for more than a certain period of time, changing to the saver mode is compulsorily executed for displaying advertisements. For example, the advertisement content is delivered for 15 seconds, and then the display is automatically returned to the original Web page. However during advertisement delivery, the original Web page will not redisplay on the screen even when the user executes a mouse operation. Therefore for example, a mouse click during the advertisement delivery, can be used to display a specified Web page such as the advertisers own Web pages. Use of such a constitution thereof, could greatly enhance the value of advertisement delivery.

Accordingly, in the alternative window type process shown in FIG. 4, even when the screen saver page is displayed, the original Web page can be remained to be displayed. Moreover, unlike the conventional pop-up advertising, another window is not displayed each time the content is changed, but the screen saver page is changed for each of delivering content. Thus, the annoyance of the user can be reduced.

When the cache function is set to be off in the Web browser 20 or the original Web page, the case, in which returning to the original Web page is impossible, can be conceived. However, the display of the screen saver page by use of another window page can be utilized as a substitution means for holding the URL. Specifically, for example, when the cache function is set to be off, in a state where the original Web page is opened, another window of the same size is opened just over the original Web page for displaying the screen saver page. When the entering operation is detected on the screen saver page, the window displaying the screen saver page can be closed.

As described above, in the embodiment, when the entering operation by the user is not executed for the displayed original Web page for a predetermined period of time, it is made possible to change to the information delivery system of a screen saver type. In other words, without the operation of installing the program by the user of the viewer PC 11 with particular conscious, new delivered content can be displayed as a screen saver.

The foregoing information delivery technology can be applied to the advertisement delivery by conceiving various contents for advertising as the delivery information (screen saver page) of the screen saver type according to the embodiment. For example, on the viewer PC 11, during the time of browsing the Web page in which the tag for the information delivery program or the information delivery program itself is embedded, if no operation is executed for the viewer PC 11 for a certain period of time, such as in cases where the user is engaged with the job not using the PC; the user is on a break; the user is not at the desk; or the user turning his or her back on the PC has a conversation with others, advertisements can be made to automatically appear on the viewer PC 11 as a screen saver.

In the advertisement delivery using the information delivery program, the advertising content is not displayed on the original Web page unlike the banner advertising. Therefore, modification of the design of the original Web page, displacement of the existing banner, or the like becomes unnecessary. Moreover, unlike the pop-up advertising, another window is not opened at each time of changing to another Web page, but the displayed page itself is changed to the advertising picture. Therefore, the annoyance of the user in the pop-up advertising can be eliminated. Furthermore, the advertising content can be displayed on the entire screen, thus providing high capability of information transmission to the user like a TV commercial. Still furthermore, it can be set by the user so that only advertisements of the categories that the user by himself or herself desires to see are made to appear, for example, by use of the cookie. Accordingly, for the side of users seeing advertisements, only necessary advertisements can be obtained, and for the side of enterprises delivering the advertisements, the efficiency of the advertisement delivery can be enhanced.

Since the advertisement delivery is made as the screen saver type, the advertisement is not displayed during the operation on the browser. Upon restarting the operation, the PC can be returned to the original state without imposing any particular burdensome task on the user, thus lowering the level of annoyance afforded to the user. Furthermore, as an information transmission means, since the advertisement is displayed in a comparatively large size, information transmission to targets in a wider range can be performed, including the PC user himself or herself and people around the PC user. The advertisement has heretofore targeted on only the Internet user. When the information amount displayed on the browser for a day is considered as resources, however, according to the embodiment, the resources having been wasted before can be effectively utilized.

Figure 5:
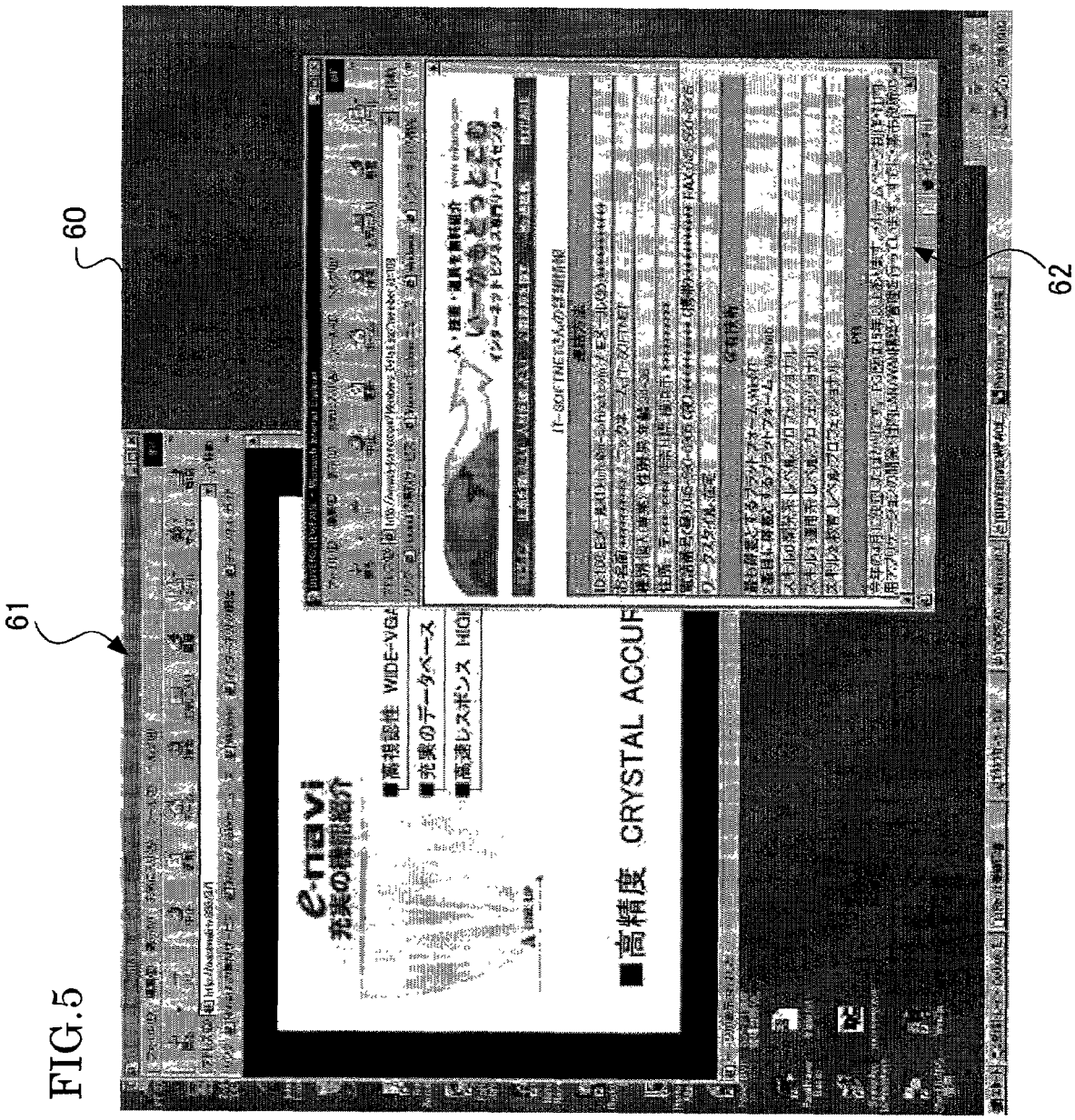
FIG. 5 is a view showing a state where a plurality of tasks are executed by the Web browser and a predetermined Web screen is changed to a saver mode.

FIG. 5 is a view showing a state where a plurality of tasks are executed by the Web browser 20 and a predetermined Web screen is changed to the saver mode. On the display screen 60 of the display, a first Web screen 61 and a second Web screen 62 are displayed. Here, it is assumed that an access to the second Web screen 62 is performed by the user, and the operation for the first Web page 61 has not been performed for a predetermined period. As shown in FIG. 5, the first Web screen 61 is changed to the screen saver mode (browser saver mode), and displays an advertising page as a screen saver page (browser saver page) in place of the Web page. Even when the screen for the e-mail or the like is displayed in place of the second Web screen 62, the process is performed in a similar manner.

Figure 6:
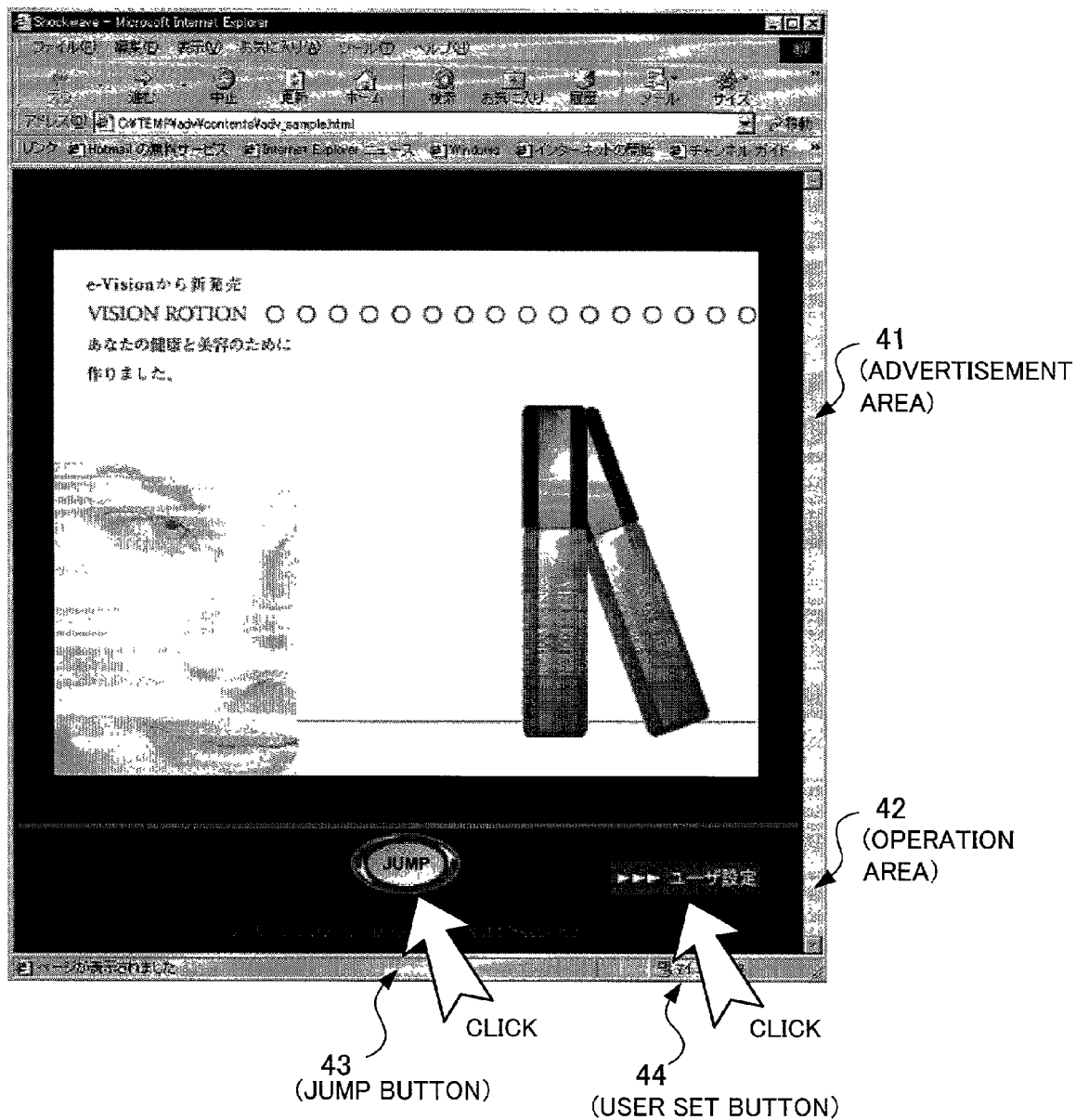
FIG. 6 is a view showing a display example of the screen saver page according to the embodiment.

FIG. 6 is a view showing a display example of the screen saver page of the present embodiment. As the screen saver page, provided are an advertisement area 41, in which the delivered Web pages are displayed in a changing manner along the passage of time and an operation area 42, in which operations by the user can be accepted. Note that: the operation area 42 may not be provided; the approximately entire screen may be served as the screen saver page; and the acceptance of the operation by the user may be enabled by a predetermined key operation as described above.

When the user as the viewer moves a cursor into the advertisement area 41 by use of a mouse, for example, it is judged that the entering operation shown in step 106 is executed, and then the screen is returned to the picture of the original Web page. However, even when the user moves the cursor into the operation area 42, the screen does not return to the original page. The user can access a desired screen, for example, by clicking the jump button 43 or the user set button 44. For example, when the jump button 43 is depressed, the screen jumps to a homepage of an advertiser whose advertisement is displayed on the advertisement area 41. When the user set button 44 is depressed, the user can choose categories of the advertisements which the user desires to see.

FIG. 7A and FIG. 7B are views for explaining filtering of delivery contents to the viewer PC 11. For example, the views correspond to the case where the user set button 44 has been depressed in FIG. 6. The user as the viewer can specify the categories of the information contents which are not desired to be delivered or which are desired to be preferentially delivered. In FIG. 7A, a delivery restriction screen 51 and a delivery set screen 52 are shown, which are displayed on the display unit 25 of the viewer PC 11 simultaneously or separately. In the delivery restriction screen 51, the viewer chooses the categories of the information contents which the viewer does not want to be delivered, and then depresses a transmit button 53. Moreover, in the delivery set screen 52, the viewer chooses the categories of the information contents which the viewer wants to be preferentially delivered, and then depresses the transmit button 54. When the categories are chosen and the transmit buttons 53 and 54 are depressed, the Web browser 20 writes the result of the choice as filter information into the cookie. The domain name written in the cookie at this time is the information delivery server 15. The cookie information is prepared in such a manner as to refer to the accessing of the information delivery server 15. Thus, the filtering of the contents can be performed.

FIG. 7B shows an example of bit string information recorded in the cookie. In this example, a bit string having bits as many as the number of kinds of categories is formed, and each bit indicates a category thereof. Here, the bit corresponding to the category to which the viewer indicates his or her intention of "not want to see" is set to be on. The bit string information shown in FIG. 7B is recorded in the cookie of the browser of the each viewer such as the Web browser 20. The delivery program 32 of the information delivery server 15 can choose the delivery content based on the cookie information, which is transmitted to the information delivery server 15 each time the viewer accesses the information delivery server 15. The same category bits are given to the delivery content, and whether or not the delivery content coincides with the filter condition of the user is judged based on the condition that the logical product (BIT AND) is more than zero.

The cookie information, once written is transmitted whenever the viewer re-accesses a page on the domain, unless the viewer does not wish to transmit the cookie information. As a standard of the cookie information, the program operating under a certain domain cannot refer or rewrite the cookie information of the other domains. In this embodiment, the delivery program 32 deciding the contents to be delivered is located on the information delivery server 15 which is a computer on the network 13, and the domain of the server to which the cookie information is written and the domain of the information delivery server 15 are made to coincide with each other. Therefore, the contents based on the user information can be delivered. Moreover, the server in which the cookie information is written and the information delivery server are not necessarily operated on the same machine. For it does not matter that both are physically divided, unless the page having the cookie written and the information delivery program for choosing the delivery contents operate as contents in the same domain.

Figure 8:
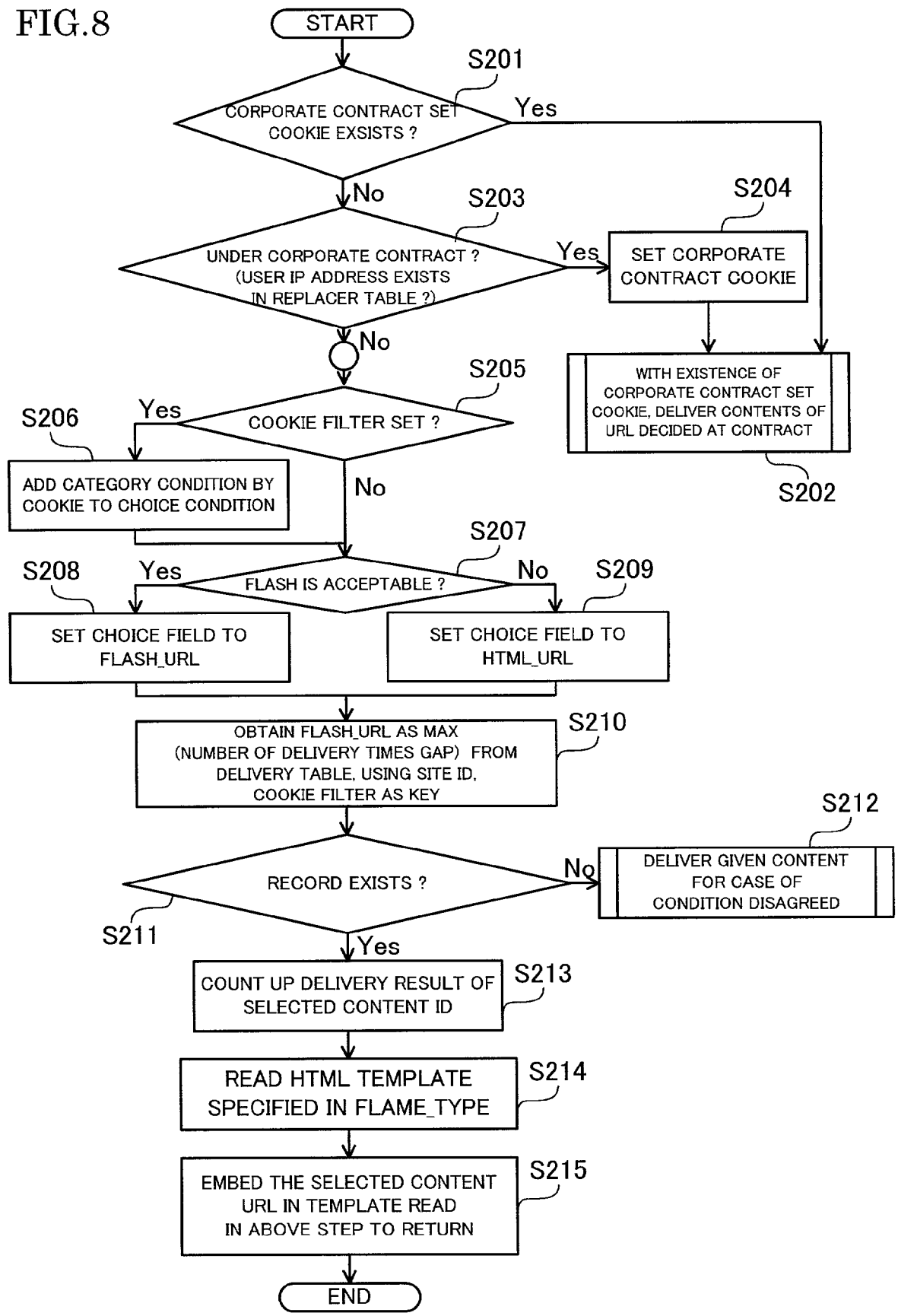
FIG. 8 is a flowchart showing a domain filtering process executed in an information delivery server 15.

FIG. 8 is a flowchart showing a domain filtering process executed in the information delivery server 15. The domain filtering process is to materialize the needs for exchanging the delivery contents or limiting the categories of the delivery contents by the user group unit such as an enterprise unit. The delivery program 32 of the information delivery server 15 registers the IP network address or the domain which are used by the group desiring to control the delivery contents, such as a corporation, in a database on the information delivery server 15.

First, the information delivery server 15 recognizes the group such as a company, to which the user as the viewer belongs, based on the user IP address contained in the HTTP request header. In this embodiment, the cookie information can be made to contain a corporate contract set cookie for indicating whether or not the corporations are under contract and the category filter (cookie filter) for personal information. Whether or not the corporate contract set cookie is in the request transmitted from the Web browser 20 is judged (step 201). With the corporate contract set cookie, the contents of the URL decided at the time of contract are delivered to the viewer PC 11 (step 202). Without the corporate contract set cookie, whether or not the corporate contract to the recognized group exists is judged (step 203). Specifically, whether or not the recognized user IP address is in table information storing information of groups under corporate contract is judged. With the corporate contract to the group, the corporate contract set cookie is set (step 204), and then the contents at the URL decided at the time of contract are delivered to the viewer PC 11 (step 202). By setting the corporate contract set cookie in step 204, in the case where requests come from the same user hereafter, processing of step 203 and step 204 can be omitted. In the case with the corporate contract, since only the contents at the URL decided at the time of contract are delivered, information which an enterprise does not want to appear on the viewer PC 11, being used by employees of the enterprise, can be prevented from appearing on the screen. The information which the enterprise does not want to appear includes, for example, contents of competitors and contents of entities not relevant to the operation of the business of the user.

Without the corporate contract in step 203, it is determined whether the cookie filter as a personal filter has been set or not (step 205). In the case where the cookie filter is set, a category condition for delivering is added to a choice condition by the user contents filter generating program 38 (step 206), and then the process proceeds to step 207. In the case where the cookie filter is not set in step 205, the process proceeds directly to step 207.

In step 207, whether or not the Flash is acceptable is determined. The Flash developed by the Macromedia Inc. in the U.S. enlarges expression ability regarding multimedia information such as animations. Regarding the viewer PC in which the Flash is acceptable, in order to preferentially make the Flash contents to appear, the user contents filter generating program 38 sets a choice field in the database to FLASH_URL (step 208), and then the process proceeds to step 210. In the case where the Flash is not acceptable, in order to make the usual HTML contents to appear, the choice field in the database is set to HTML_URL (step 209), and then the process proceeds to step 210.

Note that, though an explanation has been made regarding the Flash, in step 207, the type of medium for the contents to be delivered, (such as animations, audio, Flash, static images, and character images)are prioritized, and the type of medium is selected in accordance with the performance capability of the viewer's. For example, it is assumed that the media are prioritized in an order of animations, audio, Flash, . . . , and so on. In the case where the viewer browser is capable of accepting animations, animations can be delivered. Meanwhile, in the case where the browser is capable of accepting audio and Flash, but not animations, the audio contents can be delivered.

In step 210, using a site ID for identifying the site which provides the original Web page and the cookie filter as keys, FLASH_URL as MAX (the number of delivery times GAP) is obtained from a delivery table. For example, in use of a system in which advertisers are charged based on the number of delivery times, when the deliveries of a certain number or more have been performed, some advertisers do not want to be charged for more delivery operations. In a case like this, by writing the maximum delivery number to the cookie, the condition of the delivery number can be set for each customer as the advertiser or for each URL.

In step 211, the database is processed by the Structured Query Language (SQL). A record which meets with the conditions of the Flash information, the cookie information, the delivery number, and the site ID is extracted. When the record does not exist, that is, when the conditions are not agreement with any record and the record of the content to be delivered does not exist (there is no advertisement for appearing), a predetermined particular or specified content is delivered (step 212). When the record exists, a delivery result of the selected content ID is counted up (step 213). Since FLAME_TYPE for regulating the white or black of the background color, button positions, or the like is specified for each site, an HTML template specified for each site is read (step 214). And then, the selected content is embedded into the read template to return to the viewer PC 11 (step 215). Note that returning of the content described above does not necessarily mean that the content itself in the program form is returned. Only a storing location (URL) of the content may be returned.

Figure 9:
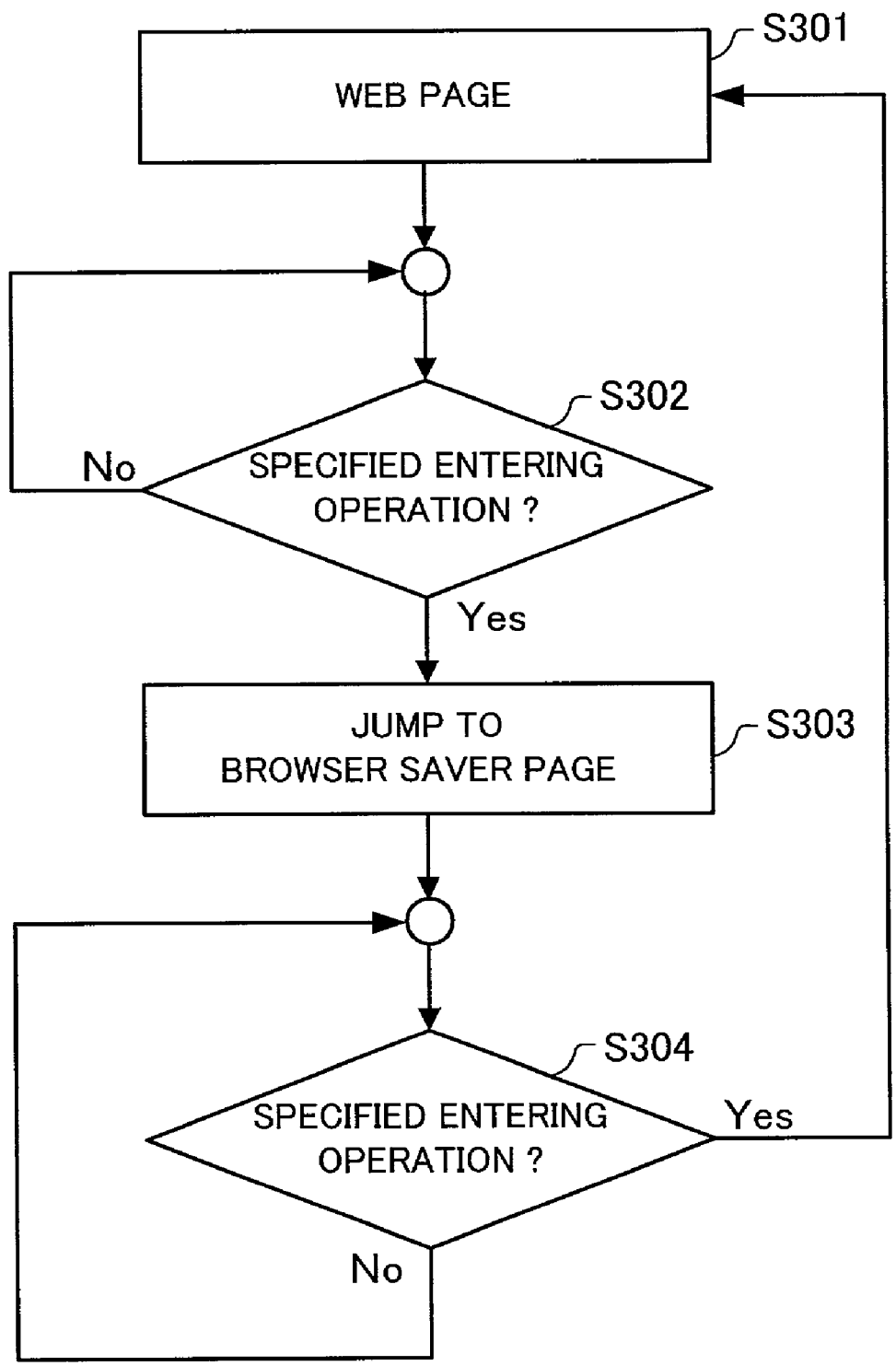
FIG. 9 is a flowchart showing another example regarding a trigger for changing to a browser saver mode.

FIG. 9 is a flowchart showing another example regarding a trigger for changing to the browser saver mode. As for the method of displaying the saver page, here, a Web browser 20 displays a Web page (step 301). In this state, it is determined whether a specified operation such as depressing of an escape (ESC) key, for example, has been executed or not is determined (step 302). If the specified operation has not been executed, the Web browser awaits this operation, but when the prescribed operation is made, the Web browser jumps to the screen saver page (browser saver page) (step 303). As such when a particular key or the like is depressed while the user browses the Internet contents on the Web browser 20, the Web browser 20 can be forced into a saver mode. Thereafter, it is determined whether the entering operation such as a mouse click has been executed by the user for a task (a window in execution) which the Web browser 20 performs (step 304). When the entering operation is executed, the process returns to step 301 to display the first Web page.

By use of the above described constitution, for example, when the user is to be away from the desk, the user can control and protect the computer screen by himself or herself. The complicated operation has been heretofore required, such as resetting of the set time of the screen saver installed in the computer, while it has been difficult to flexibly use the screen saver by the user intention depending on the situation in such a way that the screen saver function is immediately started. By the foregoing constitution, the screen saver can be flexibly started depending on the situation, and the effect can be exerted in the case where the user does not want the other person to see his or her own computer screen, or the like. Furthermore, the conventional effect of preventing burn-in of the screen can be improved.

Next, description will be made on an action in returning from the browser saver mode (screen saver mode) to the normal mode.

Figure 11:
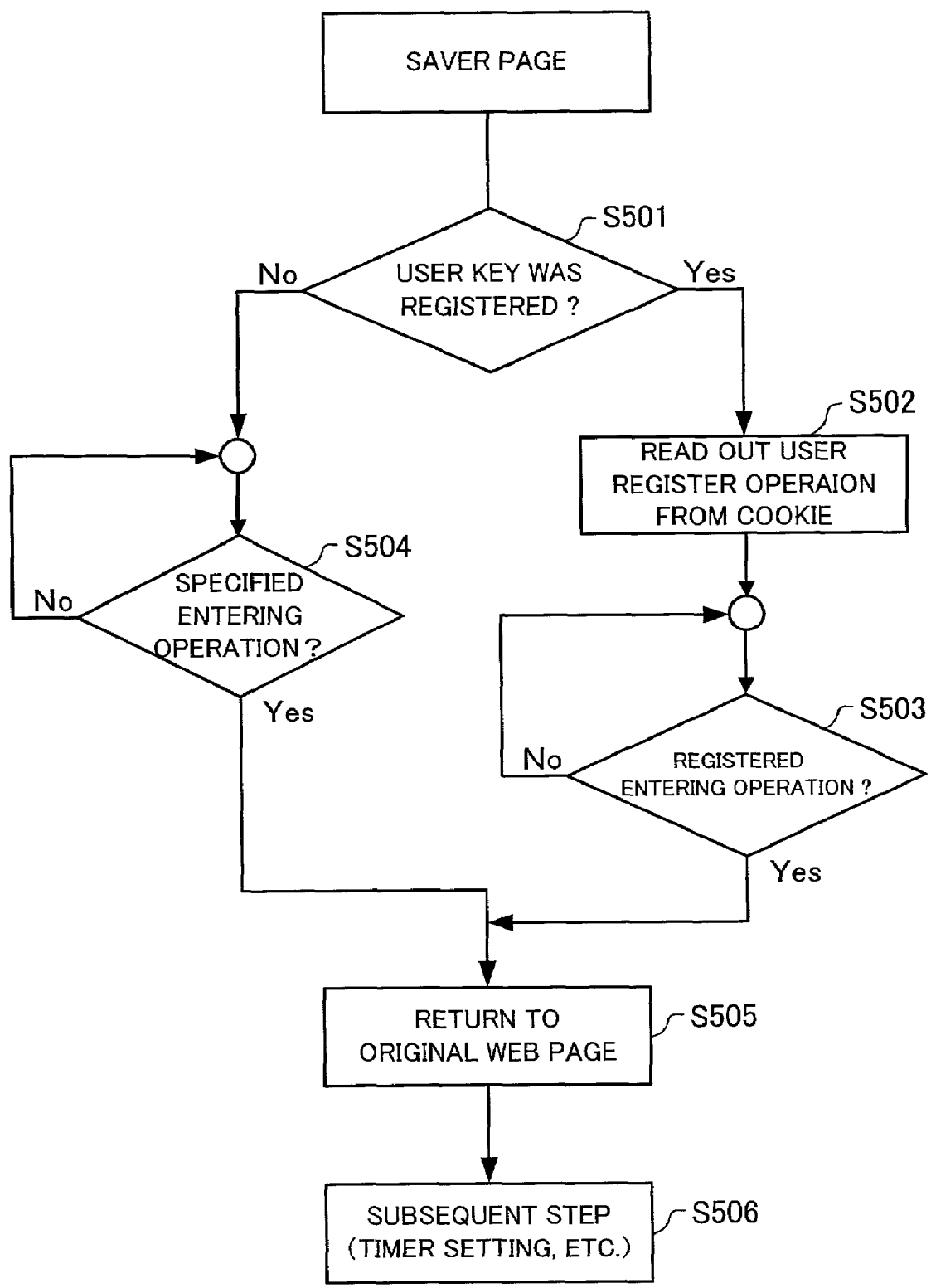
FIG. 11 is a view showing a flow of a saver interruption process depending on a performance of the register operation.

FIG. 10A, FIG. 10B and FIG. 11 are views for explaining a customizing function of the user entering operation for interruption to the saver. FIG. 10A and FIG. 10B are views for explaining a registering work of the user operation; FIG. 10A shows a process flow thereof; and FIG. 10B shows a user operation register page displayed on the screen. FIG. 11 is a view showing a flow of the saver interruption process depending on the performance of the register work. The processes in the method of displaying a saver page are executed on the Web browser 20 by use of a program provided from the information provider server 14, for example.

In registering the user entering operation, as shown in FIG. 10A, first, a connection to the user operation register page is made (step 401), and whether or not the user key register has been made is determined (step 402). When the user key register has been made, the user register operation is read out from the cookie (cookie file 22) (step 403), and the user operation register page as shown in FIG. 10B is displayed. The process then proceeds to step 404. In FIG. 10B, "mouse movement" is selected as the entering operation for returning from the saver mode. If the user key has not been registered in step 402, the user operation register page is displayed but not highlight is made for any particular portion. The process then proceeds to step 404. After the selection of the register operation, in which the particular key from the user is specified (step 404), depressing of the OK button is waited (step 405). For example, when the cancel button, not the OK button, is depressed, the user register work is terminated. When the OK button is depressed, the operation selected in step 404 is written in the cookie (cookie file 22) (step 406), and the process is terminated. As described above, the user can individually customize and register the operation for returning from the saver page to the original page (for jumping to the target page).

The process of returning from the saver mode to the original Web page is performed as follows. As shown in FIG. 11, in a state where the saver page is displayed, it is determined whether a user key registration is made or not (step 501). When the user key registration is made, the user register operation is read out from the cookie (cookie file 22) (step 502), and the registered entering operation is waited (step 503). When the registered entering operation is executed, returning to the original Web page is executed (step 505), and then the subsequent steps such as the timer setting are carried out (step 506). When the user key registration is not made in step 501, the specified entering operation is waited (step 504). When the specified entering operation is performed, returning to the original Web page is executed (step 505), and then the subsequent steps are carried out (step 506). As described above, the trigger for returning from the saver mode to the original Web page can be made such that the returning action is carried out only when the specified entering operation is executed by the user. Conversely, returning from the saver mode to the original Web page is not performed until the particular operation is executed. Accordingly, any person does not know the key other than the person who registered the key for returning to the original page, thus enabling a simple screen lock function to be performed.

Next, description will be made on a process related to a session executing on the information delivery server 15, for example. In the embodiment, a session ID is assigned at each time of changing from the normal Web page to the saver page on the server side (information delivery server 15), and recorded in a database (DB) or a log file as a log on the information delivery server 15. The term "session" here indicates a series of conversation between the browser (Web browser 20) and the delivery server (information delivery server 15) after changing from the normal Web page to the saver page till returning to the original Web page. For example, in the case of "normal Web page [→delivery server→saver page 1→delivery server→saver page 2→delivery server→saver page 2→] normal Web page [→delivery server→saver page 1→delivery server→saver page 2→delivery server→saver page 3→] normal Web page", the portion indicated by the bracket [ ] is a session of one unit. The session ID is an identifier for identifying the individual session indicated by the bracket [ ].

FIG. 12 is a view showing a form example of the log file (DB) stored in the information delivery server 15. Here, the session ID is assigned as well as the information of the user IP address, original page URL, delivery time, and the like. The same session ID is assigned to the forth, sixth, and seventh rows, which can be understood to be the same session. The information delivery server 15 determines whether or not the session ID is set in a call parameter of the delivery request from the Web browser 20 on the client side. When the session ID is not set, the information delivery server 15 decides that the session is new, or changing from the normal Web page to the saver page is performed for the first time, and creates the identifier for identifying all the sessions to return the identifier by embedding the identifier in the HTML page to be returned.

As described above, since changing between the normal Web page and the saver page are managed by assigning the sessions ID, the number of continuous delivery times can be obtained. Even in the case where a value of the HTTP Refferrer variable, which is a character string indicating the URL of a link origination, is unstable, or even in the case where the delivery server is accessed via a proxy server, the session can be accurately recorded. Moreover, for each session, the delivery order of contents can be analyzed thereafter. For example, it is highly possible that the first and the last contents delivered in the session are seen by the viewer. Especially, it can be said that the last content delivered is surely seen because the viewer performs the specified entering operation during the time of delivering the content. On the other hand, it is highly possible that the contents delivered to the Web browser 20, which is left operating at midnight, is not seen. In such a case, for example, it is made possible that the number of delivery times in the session in which the number of continuous delivery times is more than 100 is counted.

Note that, although the case where the tag information is set in the HTML formatted content is shown in the embodiment in FIG. 2, a constitution can be employed, in which the tag information is embedded in the HTML formatted content produced at the time of providing the content (proxy type). For example, there exist a system in which the tag information is embedded at a relay server for the information provider server 14 at the time of providing the content, a system in which the tag information is embedded in the HTML formatted content at a provider (ISP server 12 shown in FIG. 1) at the passage thereof, or the like, the provider being for providing the viewer PC 11 with a connecting service to the Internet. Moreover, as the proxy type constitution, the tag can be automatically inserted at a gateway apparatus for the Internet, such as a router, at home or an office. In the case of employing the foregoing constitution, it becomes possible to decide for each home or office whether or not the function is embedded. The proxy type constitution is advantageous in that the time and labor for embedding the tag information in the individual HTML formatted content can be saved. Furthermore, for example, a constitution can be employed, in which the information receiving program itself is embedded in the HTML formatted content, instead of the tag information in one line. In this case, the operation of the viewer PC 11 to pull the information receiving program becomes unnecessary.

An advantageous point of the proxy server is that it not only provides contents from a specified information delivery server 15 (the site in which the information receiving program is introduced), but it can provide contents passing through the proxy apparatus, such as the information providing service of the screen saver type according to the embodiment. The proxy type has an advantage in saving the time and labor for embedding the tag for the particular site. However, the Web server (software) has a function of adding header or footer information all at once, and the operation of embedding the tag is not executed for each page because this function is used. The tag is added all at once for a unit such as a particular site and directory.

As described above, according to the embodiment, in the case where the predetermined entering operation is not executed by the input device, during the predetermined period of time (specified time) after the Web browser 20 obtains the HTML contents as a Web page, the Web browser 20 is allowed to automatically change the Web page to the screen saver page. Therefore, the screen saver picture can be automatically displayed without the installation of the screen saver program (information receiving program). In addition, since the Web browser 20 is allowed to automatically change the displayed content from the original Web page to the screen saver page, the screen saver can be generally managed. Moreover, the management and operation of contents of the screen saver pages can be performed on the information delivery server 15 side.

Furthermore, since the management of the screensaver pages (displayed contents) is performed on the information delivery server 15 side, as descried above, there is an effect that the latest contents can always be transmitted, while audio, complicated movies, and the like, as well as simple images can be provided to be outputted and displayed. The use of the screen saver page as an advertising medium enables advertising for a number of unspecified users.

As described above, according to the present invention, in the information terminal of the user, the displayed contents on the screen of the monitor can be optionally changed.

What is claimed is:

1. An information delivery system, comprising:
    a computer terminal; and
    an information provider server,
    wherein said computer terminal and said information provider server are connected with each other via a network;
    wherein said information provider server transmits content having an information receiving program or a tag for an information receiving program to said computer terminal in response to being accessed by said computer terminal,
    wherein said computer terminal executes a plurality of tasks, including a browser application, in a plurality of application windows simultaneously displayed on the computer terminal, and the content is displayed by the browser application in one window of the plurality of windows;

wherein said computer terminal accesses and retrieves delivery information from a predetermined server via the network by the browser application, and without changing information displayed in other windows of the plurality of windows, automatically displays the delivery information in the one window, in the case where, after said browser application displays the content in the one window, it is judged that an entering operation is not executed in the one window for a predetermined period of time by said information receiving program or the information receiving program obtained by the tag, even when an entering operation is executed in the other windows during the predetermined period of time; and wherein said information receiving program is terminated when an entering operation is executed in the one window to access information other than the content transmitted by the information service provided or to close the one window.

2. The information delivery system according to claim 1, further comprising:

an information delivery server connected to the network, wherein said information delivery server provides the delivery information in response to being accessed by said computer terminal.

3. The information delivery system according to claim 1, wherein said information receiving program includes:

a category specifying function that specifies a category for which a user desires to obtain the delivery information; and a writing function that writes information regarding the category specified by said category specifying function into a cookie as user information, said cookie being transmitted to the information provider server by said browser application when said browser application accesses said information provider server.

4. An information delivery program delivered according to a Web page obtained from an information provider server via a network and displayed by a browser application in one window of a plurality of windows simultaneously displayed on a computer that executes a plurality of tasks, including the browser application, in the plurality of windows, causing the computer to execute:

an entering operation judgment function for judging that an entering operation by a user is not executed for said Web page obtained via the network and displayed on the computer for a predetermined period of time under a condition that said Web page obtained via the network is displayed;

a content obtaining function for obtaining content by the browser application from a predetermined server via the network in the case that it is judged that the entering operation by the user is not executed for said Web page by said entering operation judgment function, even when an entering operation by the user is executed in other windows of the plurality of windows during the predetermined period of time; and a content display function for displaying the content obtained by said content obtaining function in said Web page, without changing information displayed in the other windows;

wherein said information receiving program is terminated when an entering operation is executed in the one window to access another Web page other than said web page or to close the one window.

5. The information delivery program according to claim 4, causing the computer to further execute a display restart function for restarting display of the Web page in a case where a predetermined entering operation to the browser application displaying the content is executed by user, after the content is displayed in place of the displayed Web page by said content display function.

6. The information delivery program according to claim 4, causing the computer to further execute:

a category specifying function that specifies a category for which the user desires to obtain content from the predetermined server; and a writing function that writes information regarding the category specified by said category specifying function into a cookie as user information, said cookie being transmitted to the information provider server by said browser application when said browser application accesses said predetermined server;

a category specifying function that specifies a category for which a user desires to obtain the alternate content; and a writing function that writes information regarding the category specified by said category specifying function into a cookie as user information, said cookie being transmitted to the information provider server by said browser application when said browser application accesses said information provider server.

7. A server which is connected to a network and provides a computer apparatus connected to the network with a predetermined program, wherein the computer apparatus executes a plurality of tasks, including a browser application, in a plurality of application windows simultaneously displayed on the computer apparatus, said server comprising:

an accepting means of a program receiving request for accepting a program receiving request executed based on tag information contained in an HTML content which is obtained by the computer apparatus from an information provider server via the network; and a program providing means for providing an information receiving program based on the program receiving request, the information receiving program being for accessing a predetermined server via said network from the computer apparatus to pull alternate content which is to be displayed by the browser application in place of the HTML content displayed in one window of the plurality of windows on the computer apparatus, without changing information displayed in other windows of the plurality of windows, in the case where, after the HTML content is displayed in the one window, no operation is executed in the one window for a predetermined period of time, even when an entering operation is executed in the other windows during the predetermined period of time, wherein said information receiving program is terminated when an entering operation is executed in the one window to access information other than the HTML content transmitted by the information service provided or to close the one window.

8. An advertising information delivery method for delivering advertising information to a viewer computer terminal via a network, wherein the viewer computer terminal executes a plurality of tasks, including a browser application in a plurality of application windows simultaneously displayed on the viewer computer terminal said advertising information delivery method comprising the steps of:

embedding an information receiving program in the HTML content obtained by the viewer computer terminal by accessing an information provider server via the network;

supervising an entering operation for said HTML content displayed by the browser application in one window of the plurality of windows of said viewer computer terminal by use of the information receiving program after the HTML content is displayed in the one window of the viewer computer terminal;

delivering the advertising information to the viewer computer terminal from a predetermined server via the network when it is judged that the entering operation is not executed for said HTML content displayed in the one window of said viewer computer terminal for a predetermined period of time by said information receiving program, even when it is judged that an entering operation is executed in other windows of the plurality of windows during the predetermined period of time;

displaying the advertising information in the one window without changing information displayed in the other windows; and terminating said information receiving program when wherein said information receiving program is terminated when an entering operation is executed in the one window to access information other than said HTML content transmitted by the information service provided or to close the one window.

9. The advertising information delivery method according to claim 8, wherein it is determined whether a predetermined operation is executed or not for the viewer computer terminal, and when the predetermined operation is executed, the advertising information is delivered without awaiting a passage of the predetermined period of time.

10. The advertising information delivery method according to claim 8, further including the steps of:

specifying a category for which a viewer desires to obtain advertising information by use of a category specifying function of said information receiving program;

writing information regarding the category specified by said category specifying function by the browser application into a cookie as viewer information, and transmitting said cookie to said information provider server by the browser application when the browser application accesses said information provider server.

11. The advertising information delivery method according to claim 10, further including the steps of:

determining whether said cookie is a corporate contract set cookie; and when said cookie is not a corporate contract set cookie, determining whether said viewer is subject to a corporate contract by judging an IP address of the viewer computer terminal.

12. The advertising information delivery method according to claim 10, further including the steps of:

determining that said cookie is a personal cookie when said cookie is not a corporate contract set cookie and judging step indicates that said viewer is not subject to a corporate contract.

* * * * *